US012418321B2

(12) United States Patent
Wahl

(10) Patent No.: US 12,418,321 B2
(45) Date of Patent: Sep. 16, 2025

(54) LOCATION SYSTEM WITH ULTRA-WIDEBAND (UWB) INFRASTRUCTURE AND DISCOVERY INFRASTRUCTURE

(71) Applicant: TRUMPF Werkzeugmaschinen SE + Co. KG, Ditzingen (DE)

(72) Inventor: Eberhard Wahl, Weilheim an der Teck (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 420 days.

(21) Appl. No.: 18/054,552

(22) Filed: Nov. 11, 2022

(65) Prior Publication Data

US 2023/0063193 A1 Mar. 2, 2023

Related U.S. Application Data

(63) Continuation of application No. PCT/EP2021/062636, filed on May 12, 2021.

(30) Foreign Application Priority Data

May 15, 2020 (EP) ..................................... 20175059

(51) Int. Cl.
H04W 64/00 (2009.01)
H04B 1/7163 (2011.01)
H04W 88/06 (2009.01)

(52) U.S. Cl.
CPC .......... *H04B 1/7163* (2013.01); *H04W 64/00* (2013.01)

(58) Field of Classification Search
CPC .... G01S 5/0236; G01S 5/0205; G01S 5/0268; H04B 1/7163; H04W 64/00; H04W 64/006; H04W 88/06
See application file for complete search history.

(56) References Cited

U.S. PATENT DOCUMENTS

| 11,102,746 B2 * | 8/2021 | Bartov | G01S 13/878 |
| 11,294,358 B2 * | 4/2022 | Ottnad | G05B 19/4183 |
| 11,356,811 B2 * | 6/2022 | Ottnad | H04W 4/029 |
| 11,768,268 B2 * | 9/2023 | Zhang | G01S 5/04 |
| | | | 342/451 |

(Continued)

FOREIGN PATENT DOCUMENTS

| EP | 3002603 A1 | 4/2016 |
| EP | 3786736 A1 | 3/2021 |

(Continued)

OTHER PUBLICATIONS

Martin Woolley, "Advertising Works, Part 1 | Bluetooth Technology Website," Feb. 2016, p. 1-3, Retrieved from the Internet:https://www.bluetooth.com/blog/advertising-works-part-1/ [retrieved on Oct. 31, 2022] (Year: 2016).*

(Continued)

*Primary Examiner* — Khawar Iqbal
(74) *Attorney, Agent, or Firm* — LEYDIG, VOIT & MAYER, LTD.

(57) ABSTRACT

A location system interacts with a localizing sensor operatable in an ultra-wideband (UWB) localization operation mode requiring computation of position information based on received UWB beacon signals received by the localizing sensor. The location system includes: an UWB infrastructure enabling the localizing for the UWB localization operation mode. The UWB infrastructure has: stationary transmitters emitting the UWB beacon signals into a localizing zone; discovery infrastructure wireless communicating infrastructure data about the UWB infrastructure to the localizing sensor, the discovery infrastructure having a discovery signal transceiver receiving a discovery advertisement signal from the localizing sensor and sending, in response, a provisioning signal with the infrastructure data. A data storage is configured to store the infrastructure data that is required to operate the localizing sensor in the UWB operation mode in accordance with a UWB framing protocol.

19 Claims, 6 Drawing Sheets

(56) References Cited

U.S. PATENT DOCUMENTS

| | | | |
|---|---|---|---|
| 2003/0028323 A1 | 2/2003 | Zeitler et al. | |
| 2017/0134902 A1* | 5/2017 | Bottazzi | G01S 1/042 |
| 2020/0106877 A1* | 4/2020 | Ledvina | H04W 12/06 |
| 2020/0218237 A1* | 7/2020 | Ottnad | G05B 19/4183 |
| 2021/0072373 A1* | 3/2021 | Schoenberg | G01S 13/878 |
| 2022/0149890 A1* | 5/2022 | Hariharan | H04W 88/06 |
| 2022/0201428 A1* | 6/2022 | Ertan | G06T 7/70 |
| 2022/0210620 A1* | 6/2022 | Wahl | H04B 7/2678 |
| 2025/0022331 A1* | 1/2025 | Pirch | G06V 20/52 |
| 2025/0039647 A1* | 1/2025 | Bollard | H04B 1/71632 |

FOREIGN PATENT DOCUMENTS

| | | | | |
|---|---|---|---|---|
| KR | 20190023714 A | 3/2019 | | |
| WO | WO-2019048260 A1 * | 3/2019 | | G01S 5/14 |
| WO | WO 2020064589 A1 | 4/2020 | | |

OTHER PUBLICATIONS

Bonafini Federico et al, "Exploiting Time Synchronization as Side Effect in UWB Real-Time Localization Devices," 2018 IEEE International Symposium on Precision Clock Synchronization for Measurement, Control, and Communication (ISPCS), Sep. 2018, p. 1-6, IEEE, Geneva, Switzerland.

Martin Woolley, "Advertising Works, Part 1 | Bluetooth Technology Website," Feb. 2016, p. 1-3, Retrieved from the Internet: URL:https://www.bluetooth.com/blog/advertising-works-part-1/ [retrieved on Oct. 31, 2022].

* cited by examiner

LOCATION SYSTEM WITH ULTRA-WIDEBAND (UWB) INFRASTRUCTURE AND DISCOVERY INFRASTRUCTURE

CROSS REFERENCE TO RELATED APPLICATIONS

This application is a continuation of International Application No PCT/EP2021/062636 (WO 2021/228946 A1), filed on May 12, 2021, and claims benefit to European Patent Application No. EP 20175059.3, filed on May 15, 2020. The aforementioned applications are hereby incorporated by reference herein.

FIELD

The present disclosure relates generally to a location system for localizing trackable objects, for example, in an indoor environment. In particular, the present disclosure relates to a location system enabling system-based ultra-wideband (UWB) localization and UWB self-localization within a localizing zone.

BACKGROUND

Knowing the position of trackable objects is the basis for location-aware use cases in industrial applications, such as in smart production and smart logistic scenarios. Specifically, information on the position of a trackable object can be essential for software applications operated in the context of manufacture in so called smart factories. For this purpose, various types of positioning technologies were developed. Positioning technologies as addressed herein include software and hardware-based systems that allow to position/localize (trackable) objects indoor, e.g., within a building. Positioning technologies might use wireless signals (like Impulse Radio Ultra-Wideband (UWB), Bluetooth Low Energy (BLE), WLAN/WiFi communication, 5G) or any other means (such as magnetic fields, inertial sensors) to localize an object.

For localizing a trackable object using UWB communication, i.e., exchanging UWB signals, one measures runtimes of UWB signals between the trackable object and components of an UWB infrastructure of the location system to determine respective distances. Aspects to be considered when operating a UWB location system include a localizing accuracy, a frequency at which the localizing can be performed (also referred to herein as location rate), and the number of trackable objects that can be subject to the UWB location system.

In location-aware use cases, an object may be brought into a localizing zone being covered by a specific type of location service. Then, the position of the object is tracked and the position data is used in a specific application relating to the object.

SUMMARY

In an embodiment, the present disclosure provides a location system that interacts with a localizing sensor operatable in an ultra-wideband localization operation mode requiring computation of position information based on received ultra-wideband beacon signals received by the localizing sensor. The location system includes: an ultra-wideband infrastructure configured to enable the localizing for the ultra-wideband localization operation mode. The ultra-wideband infrastructure having: a plurality of stationary transmitters configured to emit the ultra-wideband beacon signals into a localizing zone; a discovery infrastructure configured to perform a wireless communication of infrastructure data about the ultra-wideband infrastructure to the localizing sensor, the discovery infrastructure having at least one discovery signal transceiver configured to receive a discovery advertisement signal emitted from the localizing sensor and send, in response, a provisioning signal comprising the infrastructure data; and a controller configured to control the operation of the ultra-wideband infrastructure and the discovery infrastructure, wherein the controller has a processor, and a data storage. The data storage is configured to store the infrastructure data that is required to operate the localizing sensor in the ultra-wideband localization operation mode in accordance with an ultra-wideband framing protocol. The processor is configured to control the at least one discovery signal transceiver to send the provisioning signal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
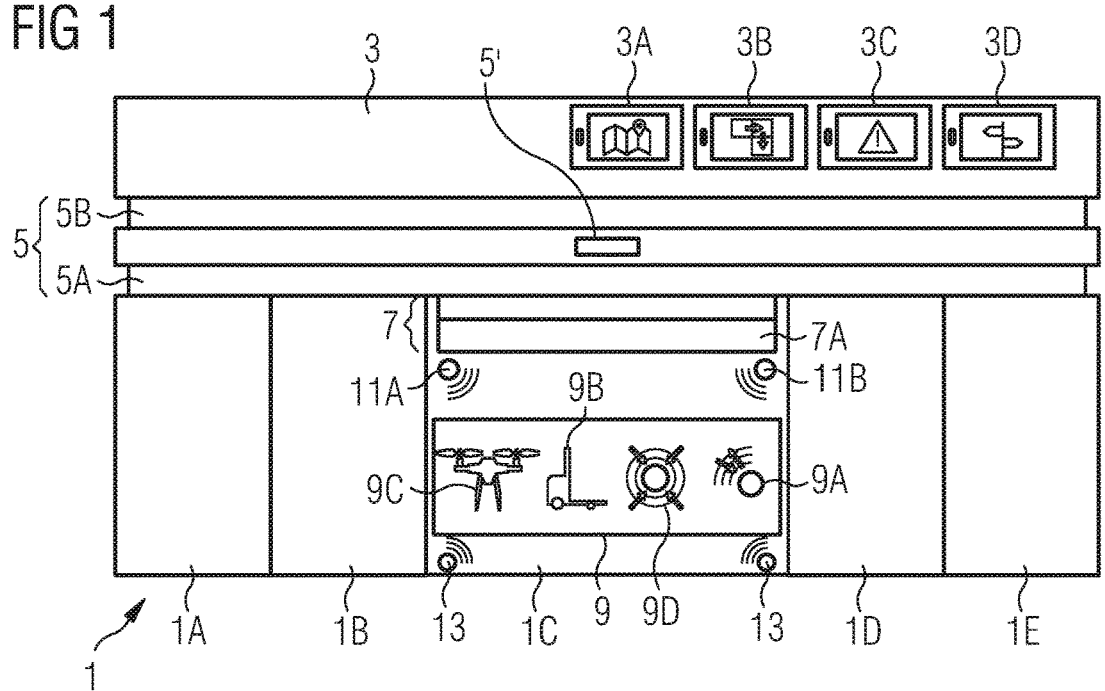
FIG. 1 is a schematic illustration of an exemplary architecture for acquiring position information and using the same in industrial applications.

Aspects of the present disclosure, inter alia, enable an integration of a trackable object into a UWB location system being installed for a given localizing zone. A preferred implementation according to the present disclosure specifically relates to trackable objects that can be operated in at least one of two ultra-wideband localization operation modes, a first mode requiring the emission of ultra-wideband response signals from the trackable object and a second mode requiring computation of position information based on received ultra-wideband beacon signals received by the trackable object. In that sense, the trackable object functions as a localizing sensor in both operation modes.

Aspects of the present disclosure enable integration of localizing sensors into a location system at different location rates by providing a specific UWB framing protocol.

Furthermore, the herein disclosed concepts contribute to seamless positioning services across different positioning technologies.

Thus, the present disclosure is directed, at least in part, to improving or overcoming one or more aspects of prior systems.

In a first aspect, the present disclosure is directed to location systems for interacting with a localizing sensor that can be operated in an ultra-wideband localization operation mode requiring computation of position information based on received ultra-wideband beacon signals received by the localizing sensor. The location systems include:

an ultra-wideband infrastructure configured to enable the localizing for the ultra-wideband localization mode, the ultra-wideband infrastructure including a plurality of stationary transmitters configured to emit ultra-wideband beacon signals into a localizing zone;

a discovery infrastructure configured to perform a wireless communication of infrastructure data about the ultra-wideband infrastructure to the localizing sensor, the discovery infrastructure including at least one discovery signal transceiver configured to receive a discovery advertisement signal emitted from the localizing sensor and send in response a provisioning signal including the infrastructure data; and a controller configured to control the operation of the ultra-wideband infrastructure and the discovery infrastructure, wherein the controller includes a processor, and a data storage. The data storage is configured to store the infrastructure data that is required to operate the localizing sensor in the ultra-wideband localization operation mode in line with an ultra-wideband framing protocol, and the processor is configured to control the at least one discovery signal transceiver to send the provisioning signal.

In another aspect, methods are disclosed for interacting with a localizing sensor that can be operated within an ultra-wideband infrastructure in at least one of two ultra-wideband localization operation modes, the two ultra-wideband localization operation modes including a first mode requiring the emission of ultra-wideband response signals from the localizing sensor, and a second mode requiring computation of position information based on ultra-wideband beacon signals received by the localizing sensor. The methods include:

storing infrastructure data about the ultra-wideband infrastructure that is required to operate the localizing sensor in the two ultra-wideband localization operation modes;

operating a discovery infrastructure to perform a wireless communication of the infrastructure data to the localizing sensor, the wireless communication including:

receiving a discovery advertisement signal emitted from the localizing sensor, and sending in response a provisioning signal including the infrastructure data; and operating the ultra-wideband infrastructure to enable the localizing:

with the first mode by, with a plurality of stationary transmitters, emitting ultra-wideband beacon signals into a localizing zone; and with a plurality of stationary receivers, receiving the ultra-wideband beacon signals and ultra-wideband response signals emitted from the localizing sensor if operated in the first mode;

receiving timing information for the ultra-wideband beacon signals and the ultra-wideband response signals from the plurality of stationary receivers;

calculating from the timing information position data of the localizing sensor within the localizing zone; and outputting the position data for use in at least one industrial application; or with the second mode by, with a plurality of stationary transmitters, emitting ultra-wideband beacon signals into the localizing zone.

In another aspect, methods are disclosed for operating a localizing sensor within an ultra-wideband infrastructure. The methods include:

receiving with the localizing sensor infrastructure data about an ultra-wideband infrastructure by wireless communication from a discovery infrastructure, wherein the infrastructure data is configured for operation of the localizing sensor within the ultra-wideband infrastructure, and wherein the wireless communication includes:

sending with the localizing sensor a discovery advertisement signal, and in response to the discovery advertisement signal, receiving with the localizing sensor a provisioning signal including the infrastructure data;

receiving with the localizing sensor ultra-wideband beacon signals emitted from a plurality of stationary transmitters of the ultra-wideband infrastructure; and emitting with the localizing sensor ultra-wideband response signals in response to the ultra-wideband beacon signals at response time points set with respect to reception time points of the ultra-wideband beacon signals using the infrastructure data.

In another aspect, methods are disclosed for operating a localizing sensor in an ultra-wideband localization operation mode for computation of position information by the localizing sensor. The methods include:

receiving with the localizing sensor infrastructure data about an ultra-wideband infrastructure by wireless communication from a discovery infrastructure, wherein the infrastructure data is configured for operation of the localizing sensor within the ultra-wideband infrastructure in the ultra-wideband localization operation mode, and wherein the wireless communication includes:

sending with the localizing sensor a discovery advertisement signal, and in response to the discovery advertisement signal, receiving with the localizing sensor a provisioning signal including the infrastructure data;

receiving with the localizing sensor ultra-wideband beacon signals emitted from a plurality of stationary transmitters of the ultra-wideband infrastructure;

deriving with the localizing sensor timing information from the ultra-wideband beacon signals; and calculating with the localizing sensor from the timing information position data of the localizing sensor using the infrastructure data.

In another aspect, location systems for interacting with a plurality of localizing sensors are disclosed. Each localizing sensor can be operated in at least one of two ultra-wideband localization operation modes. The two ultra-wideband localization operation modes include a first mode requiring the emission of ultra-wideband response signals from the localizing sensor, and a second mode requiring computation of position information based on received ultra-wideband beacon signals received by the localizing sensor. The location systems comprise:

an ultra-wideband infrastructure that is configured to enable the localizing for each of the two ultra-wideband localization modes. The ultra-wideband infrastructure includes:

a plurality of stationary transmitters that are configured to emit ultra-wideband beacon signals into a localizing zone; and a plurality of stationary receivers that are configured to receive the ultra-wideband beacon signals and the ultra-wideband response signals emitted from a first group of the localizing sensors operated in the first mode;

a discovery infrastructure that is configured to perform a wireless communication of infrastructure data about the ultra-wideband infrastructure to the localizing sensors. The discovery infrastructure includes:

at least one discovery signal transceiver that is configured to receive a discovery advertisement signal emitted from one of the localizing sensors and send in response a provisioning signal including the infrastructure data; and a controller for controlling the operation of the ultra-wideband infrastructure and the discovery infrastructure. The controller includes a processor, a data storage, and a data output. The data storage is configured to store the infrastructure data that is required to operate the localizing sensor in at least one of the two ultra-wideband localization operation modes, and the processor is configured to:

receive timing information for the ultra-wideband beacon signals and the ultra-wideband response signals and calculate from the timing information position data of the localizing sensors of the first group within the localizing zone; and output the position data at the data output (107C) for use in at least one industrial application.

By way of example, in some embodiments, the infrastructure data can include at least one of:

information of the positions of the stationary transmitters within the localizing zone;

timing information with respect to ultra-wideband beacon signals emitted from the stationary transmitters. Additionally or alternatively, the discovery infrastructure further can be configured to receive information on the localizing sensors from the controller.

In some embodiments, the at least one discovery signal transceiver can be configured to wirelessly receive or transmit at least one of:

an advertisement signal configured to initiate a wireless communication with a specific one of the localizing sensors entering the localizing zone;

a provisioning signal configured to provide the infrastructure data to the specific one of the localizing sensors; or a closing signal configured to close an ultra-wideband communication when the specific one of the localizing sensors leaves a respective localizing zone.

In some embodiments, the at least one discovery signal transceiver can be configured to wirelessly communicate in the frequency range around 2.4 GHz and in particular can be configured to use an exchange protocol based on Bluetooth, Bluetooth low energy, or Zigbee.

In some embodiments, an area associated to the controller can be divided into a plurality of zones, and a first zone of the plurality of zones is associated with:

a first subgroup of the plurality of stationary transmitters;
(-optionally a first subgroup of the plurality of stationary receivers;) and
a first discovery signal transceiver for communicating infrastructure data associated with the first zone;

a second zone of the plurality of zones is associated with:
a second subgroup of the plurality of stationary transmitters;
(-a second subgroup of the plurality of stationary receivers;) and
a second discovery signal transceiver for communicating infrastructure data associated with the second zone, and wherein optionally the second discovery signal transceiver is configured to communicate to the first discovery signal transceiver that a localizing sensor acknowledged receipt of the infrastructure data associated with the second zone. In some embodiments, the processor can have installed thereon a computer program that, when executed, performs a computation of the position based on time-of-flight measurements associated for a localizing sensor of the first group of the localizing sensors.

In some embodiments, the localizing sensor can be one of a plurality of localizing sensors that are operatable in at least one of two ultra-wideband localization operation modes. The two ultra-wideband localization operation modes include a first mode requiring the emission of ultra-wideband response signals from the localizing sensor, and a second mode being the localizing mode requiring computation of position information based on received ultra-wideband beacon signals received by the localizing sensor, wherein:

the ultra-wideband infrastructure can further include:
a plurality of stationary receivers configured to receive the ultra-wideband beacon signals and the ultra-wideband response signals emitted from a first group of the localizing sensors operated in the first mode; and the controller can further include a data output, wherein the data storage is configured to store the infrastructure data that is required to operate the localizing sensor in the two ultra-wideband localization operation modes, and the processor further can be configured to:

receive timing information for the ultra-wideband beacon signals and the ultra-wideband response signals and calculate from the timing information position data of the localizing sensors (109) of the first group within the localizing zone; and output the position data at the data output for use in at least one industrial application.

In some embodiments, the infrastructure data can include further at least one of:

information of the positions of the stationary receivers within the localizing zone;

a slot number associated to a respective one of the localizing sensors for being operated in the first mode of the ultra-wideband localization operation modes;

a localization rate associated to a respective one of the localizing sensors; or the type of ultra-wideband localization operation mode in which a respective one of the localizing sensors can be operated. Alternatively or additionally, one of the plurality of stationary transmitters and one of the plurality of stationary receivers can be implemented as a transceiver configured to receive the ultra-wideband beacon signals and the ultra-wideband response signals and transmit ultra-wideband repeater beacon signals.

In some embodiments, one of the plurality of stationary transmitters and one of the plurality of stationary receivers can be configured as:

a transceiver stationary installed in the localizing zone at a fix position, or a mobile transceiver forming a localizing sensor operated in the first mode, wherein the mobile transceiver is positioned in the localizing zone and does not move during an execution of an ultra-wideband localization operation.

In some embodiments, the plurality of stationary transmitters can be configured to emit the ultra-wideband beacon signals in accordance with an ultra-wideband framing protocol that defines a superframe to include:
- a predefined number of beacon slots,
- a pre-predefined number of ranging slots separated from the beacon slots by a predefined number of banned slots, and
- at least one rendezvous slot.

In some embodiments, the plurality of stationary transmitters can be configured to emit the ultra-wideband beacon signals in accordance with an ultra-wideband framing protocol that includes up to several hundred time slots, such as 200 to 400 time slots, in a hyperframe structure, based on the hyperframe structure the localizing sensors being operated in the first mode to emit ultra-wideband response signals at a plurality of localization rates including in particular localization rates at 8 Hz, 1 Hz, and 0.2 Hz.

In some embodiments, the second mode can be set to perform a self-localization at a localization rate given by a time duration of the superframe or smaller; and/or
wherein the ultra-wideband framing protocol defines a hyperframe to include a predefined number of superframes, and
the different localization rates are implemented by using selected ones of the superframes in the hyperframe for one of the plurality of localization rates associated to a ranging slot; and
wherein optionally for the highest localization rate, each superframe is used and subgroups of equally spaced superframes are used for other localization rates.

In some embodiments, the location system can further include at least one of:
a plurality of localizing sensors, each localizing sensor configured to wirelessly communicate with the discovery infrastructure to receive the infrastructure data; and operate in at least one of the two ultra-wideband localization operation modes, or
at least one further mobile device that is configured to wirelessly communicate with the discovery infrastructure to receive the infrastructure data; and compare the infrastructure data with environment data that the mobile device derives from imaging an environment of the mobile device with an image acquisition system.

Furthermore, in some embodiments of the ultra-wideband infrastructure a stationary transmitter can be combined with a stationary receiver. For example, the respective functionalities can be provided with a transceivers that can receive the ultra-wideband response signals and the ultra-wideband (master) beacon signals and transmit ultra-wideband (repeater) beacon signals.

Other features and aspects of this disclosure will be apparent from the following description and the accompanying drawings.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization by the inventors that advancing indoor localization in industrial applications requires a flexible and open architecture. As a requirement for the architecture, it was realized that the combination of various types of positioning technologies should be possible. If furthermore all positioning technologies output position information to a common hub, the hub can make the position information available to the industrial applications. Thus, it was further realized that a specific hub structure can provide an interface between the positioning technologies and the industrial applications.

Due to the limited size of a localizing zone covered by an individual location system, it was further realized that the architecture needs to allow objects to be tracked to move into and out of location systems smoothly. It was realized that this can be supported by a discovery procedure provided by a specific discovery infrastructure being part of a location system. A discovery infrastructure, for example, can enable the integration of objects moving into a specific localizing zone of a UWB location system.

It was further realized that providing a plurality of location rates within one UWB location system may allow increasing the number of tracked objects by that UWB location system, while still each object is tracked at a location rate sufficient for its purposes.

In the following, the concept of providing positioning services across different location systems using a plurality of positioning technologies in a plurality of localizing zones is described in connection with FIG. 1. Then, a UWB localization is described as an example in connection with FIG. 2. The UWB localization in particular uses an automated discovery procedure as explained in connection with FIG. 3 and allows the integration of a plurality of localizing sensors (trackable objects) that can be operated at different localization rates. System-based localization and self-localization are explained in connection with FIG. 4 and FIGS. 5A and 5B. Finally, an exemplary location system is described in connection with FIG. 6 and an exemplary flowchart illustrating the discovery and UWB location procedures is described in connection with FIG. 7.

Referring to the schematic illustration shown in FIG. 1, various types of positioning technologies 1 can be used to provide position data to industrial applications 3 such as asset tracking 3A, manufacturing controlling 3B, anti-collision monitoring 3C, and (indoor) navigating 3D.

Examples of position technologies 1 are, for example, based on RFID, 5G, UWB, BLE, and GPS that are exemplary set up in respective localizing zones 1A, 1B, 1C, 1D, and 1E (2D or 3D spatial areas subject to a position technology).

A central software system 5 can act as a hub between the positioning technologies 1 and the industrial applications 3. For example, the central software system 5 can manage via a first open interface 5A the various localizing zones 1A, 1B, 1C, 1D, and 1E that are covered by different positioning technologies, for example, within a production site. While a localizing zone 1A, 1B, 1C, 1D, and 1E may be covered by a specific type of positioning technology, localizing zones 1A, 1B, 1C, 1D, and 1E may alternatively at least partly overlap.

Furthermore, the central software system 5 may provide a second open interface 5B to the various industrial applications 3.

As further shown for the operation of a UWB location system within the (UWB) localizing zone 1C, a location system may comprise a controller 7 providing data to the first open interface 5A. The controller 7 may further provide a UWB interface 7A to various components of the UWB location system such as stationary devices and mobile devices with localizing sensors. Examples of stationary devices include a master (or root) UWB transceiver 11A, a UWB receiver 13, and a relay UWB transceiver 11B. Examples of mobile devices that use localizing sensors to create position information are schematically indicated in FIG. 1: a UWB tag 9A, an automated guided vehicle (AGV) 9B, a flight object 9C (e.g., a drone), and a self-localizing sensor 9D configured to perform self-localization calculations within the UWB environment.

Localizing sensors are trackable objects or in short trackables. Localizing sensors are also referred to as mobile locator sensors, mobile locators, markers, (mobile) tags, tag devices, or mobile units. Localizing sensors can be implemented, for example, as a mobile tag with an e-ink display to be attached to a component to be tracked. Localizing sensors can further be implemented, for example, within automated guided devices (such as the AGV 9B or the drone 9C), a smartwatch for a worker. A localizing sensor generally includes one or more positioning electronics that includes electronic circuits and electronic components (such as receivers, transmitters, antennas) for UWB localization and radio data communication such as radio BLE or WiFi communication. A localizing sensor may also include optionally a GPS-system for outdoor positioning. A localizing sensor may include various optional features such as a display, e.g., an e-ink display, a fastening system for attachment at an object/person to be tracked, batteries, processors, data storage devices etc.

The mentioned self-localizing sensor 9D is a specific type of a localizing sensor that includes a processor configured to compute the position of the self-localizing sensor by itself from received UWB signals. This kind of sensor can typically be used on flight object 9C such as a drone or AGVs such as AGV 9B for self-location. In order to improve location accuracy those autonomous moveable objects typically also can use other moving-sensor(s), like an inertial sensor and can use a sensor-fusion of the UWB-self-location and those other sensor(s).

The central software system 5 includes a processor 5' that receives position information on various objects as generated by the respective positioning technologies and transforms the position information of the objects, which were tracked within the localizing zones, into, e.g., global "geo"-coordinates. Thereby, the position information can be used in a large variety of respective applications.

In this context, the herein disclosed concepts aim at unifying indoor positioning technologies by providing position data on the objects via a common application interface embodied by the central software system 5. Thus, the herein disclosed concepts can further enable location-based services to industrial applications executed in Manufacturing Execution Systems (MES), Warehouse Management Systems, etc.

Figure 2:
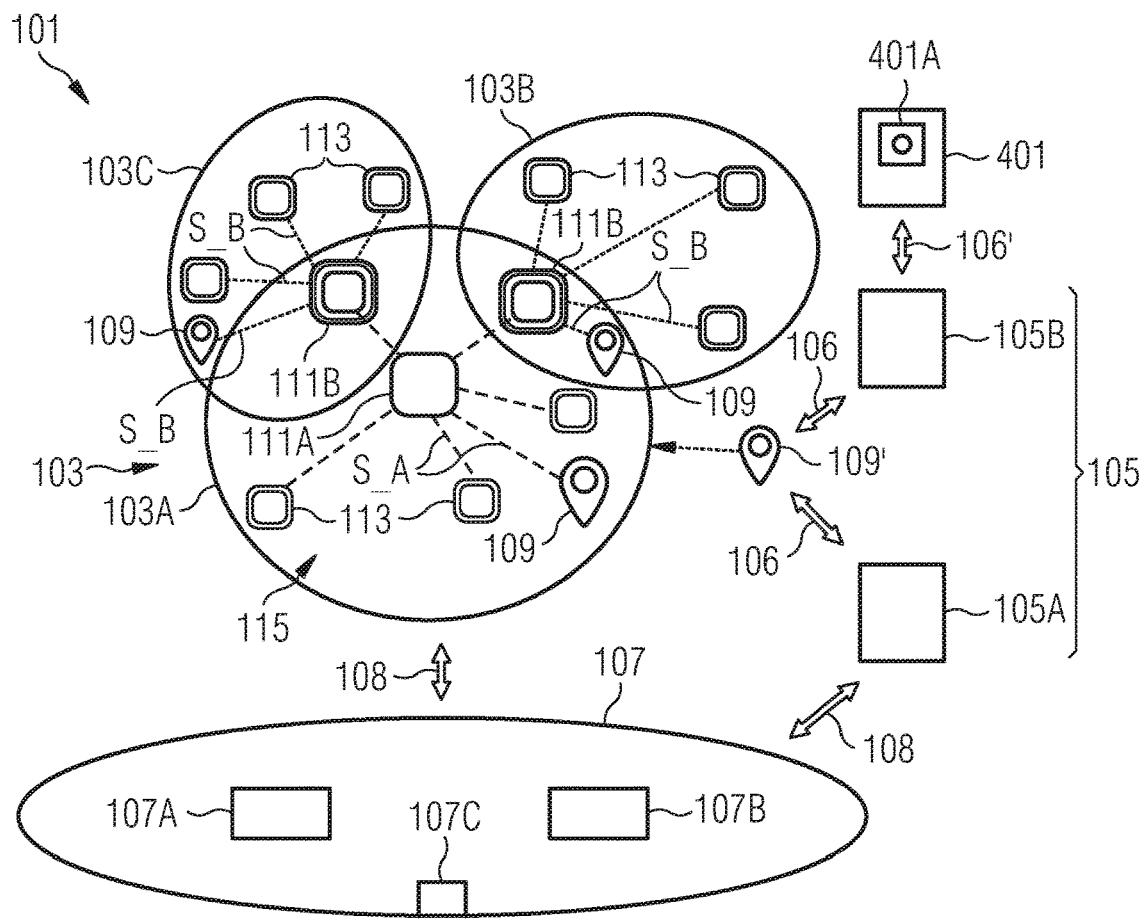
FIG. 2 is a schematic illustration of an exemplary "network topology" for UWB localization.

Referring to the schematic drawing of FIG. 2, a "network topology" (configuration) for a UWB location system 101 includes a UWB infrastructure 103, a discovery infrastructure 105, and a controller 107. The varying components can be structurally combined where feasible; e.g., the UWB infrastructure 103 and the discovery infrastructure 105 can be based on common structural components.

The UWB location system 101 represents a position technology that is based on radio exchanges between UWB-enabled devices to be tracked (localizing sensors/trackable objects 109) and components of the UWB infrastructure 103. The UWB infrastructure 103 is a location infrastructure that is configured to enable an UWB signal-exchange between transmitters, receivers, and transceivers based on a UWB framing protocol. The UWB framing protocol defines the underlying UWB procedure of the localization/ranging/position determination. The UWB procedure can be a synchronized Time Division Multiple Access (TDMA) protocol. TDMA allows several devices to share the same frequency channel by dividing the communication into different time slots at which various components such as the localizing sensor and the UWB transmitters (or UWB transceivers) are supposed to transmit UWB signal frames such as a UWB beacon signal frame/signal or a UWB response frame/signal.

Generally, UWB air-interfaces are described in IEEE Standard 802.15.4, including basic ways of how a UWB chip can communicate with another UWB chip. The herein described UWB infrastructure 103 can be applied on top of different types of UWB-chip communication schemes including those in compliance with, e.g., UWB Standards like the IEEE Standard 802.15.4 and especially including the newest version of IEEE 802.15.4z.

The operation of the UWB location system 101 is based on well-defined emission time points of UWB signals from transmitters and a precise measurement of reception time points at receivers. Precise timings of the emission and reception of the UWB signals are required to allow measurements such as time-of-flight (ToF) measurements (also referred to as time-of-arrival (ToA) measurements) or time-difference-of-arrival (TDoA) measurements with a desired accuracy.

In FIG. 2, the "network topology" of the UWB infrastructure 103 supports a master cell 103A, managed by a root device 111A. The root device 111A ensures a time synchronization between any transmitter, receiver, and transceiver of the master cell 103A. Synchronization can be achieved, for example, by sending a beacon frame BF at a regular time interval. The synchronization with the root device 111A is indicated in FIG. 2 by lines S_A.

In addition to the root device 111A, the master cell 103A may include a plurality of (for example, up to 63) further stationary devices such as stationary receivers 113 and relay transceivers 111B. All those devices are placed such that they can receive the beacon frames transmitted by the root device 111A. The root device 111A may be placed, for example, at a position within a manufacturing hall.

The master cell 103A is associated with a localizing zone 115 that is spread out by the locations of the root device 111A, the stationary receivers 113, and the relay transceivers 111B, if operated as part of the master cell 103A. Within the localizing zone 115, localization is performed based on those infrastructure components of the master cell 103A. The stationary receivers 113 and the relay transceivers 111B are also referred to as anchors as they are usually mounted at fixed positions within the localizing zone 115. Preferably, the root device 111A is positioned in a line of sight with the stationary devices of the master cell 103A to provide a good UWB synchronization link and, thus, a good localization precision.

Beacon frames transmitted by the root device 111A may not be receivable throughout a manufacturing hall, for example. This may be the case, if the position of a stationary device is not in line of sight or if the distance is too far. As indicated in FIG. 2, the mentioned relay transceivers 111B may relay the beacon frame, i.e., function as a beacon repeater to set up sub-cells 103B via synchronization of further stationary receivers 113 (and optionally further relay transceivers) with the relay transceivers 111B. This is indicated in FIG. 2 by lines S_B. A plurality of sub-cells 103B, 103C can be set up in this manner.

The localizing sensors 109 also receive the beacon frames, in order to become synchronized in time. Depending on their position, the localizing sensors 109 can receive the beacon frames from one of the root device 111A or the relay transceivers 111B.

The number of relay devices that can be used depends on the UWB framing protocol and in particular the settings of the superframe as described in connection with FIG. 4.

The controller 107 can be set up as a computer server system that is data-connected to the stationary devices via LAN and/or WLAN connections 108. The controller 107 includes a processor 107A and a data storage 107B and is configured to process information received from the stationary devices, provide set up information to the stationary devices, and to store information on the stationary devices, i.e., on the UWB infrastructure. The controller 107 implements an analyzer that is configured to receive timing information for ultra-wideband beacon signals and ultra-wideband response signals from localizing sensors and calculate from the timing information the positions of those localizing sensors. For example, a computer software program executed on the processor 107A can compute the position of the localizing sensor 109, e.g., based on a time of flight approach. The computer software program can be a locally installed software or part of a centralized control system of, e.g., a production site or a logistic site.

The controller 107 has access to a data table of the stationary devices (e.g., stored on the data storage 107B) that includes position data of the stationary devices in the localizing zone(s). The table is used to calculate respective position data of the localizing sensors 109. Knowing the relative positions of the stationary devices in the localizing zone(s), it is in particular possible to compute the fixed ToF values between the root device 111A and the relay transceivers 111B.

Based thereon, when the localizing sensor 109 performs a UWB signal-exchange with a stationary device, the controller 107 can calculate the position data for the position of the localizing sensor 109, even if no timestamp is sent with the UWB signal.

The controller 107 has further an output 107C (output interface) and outputs the position data at the data output 107C in a standardized format for use in at least one industrial application, e.g., via the first open interface 5A shown in FIG. 1.

Similarly, a self-localizing sensor can execute a computer software program in its processor. The computer software program accesses a similar data table of the stationary devices with the respective position. The computer software program is adapted to the specific UWB framing protocol and can derive the position of the self-localizing sensor "on-board" of the self-localizing sensor.

The herein disclosed UWB infrastructure of the UWB location system 101 is based upon an impulse radio signaling scheme using UWB pulses (such as band-limited pulses) given by the UWB framing protocol. The UWB infrastructure can support at least one frequency band of operation, wherein one or more channels can be used. Specifically, UWB channels can be used in the range from 3 GHz to 10 GHz, e.g., in the ranges from 3.244 GHz to 4.742 GHz or from 5.944 to 10.234 GHz. Exemplary definitions of UWB channels are given in the standard "IEEE Standard 802.15.4-2015—Standard for Low-Rate Wireless Networks" such as channel A: 3.5 GHz (bandwidth 500 MHz), channel B: 4 GHz (bandwidth 500 MHz), channel C: 4.5 GHz (bandwidth 500 MHz), channel D: 4 GHz (bandwidth 1000 MHz).

Channels A to C can have a bandwidth of 500 MHz resulting in radio pulses of 2 ns width. The pulses are emitted at a repetition rate between two pulses of about 64.10 ns (referred to as Pulse Repeat Period). A packet (sequence) of pulses may comprise, e.g., 127 pulses, resulting in a time duration associated with a symbol of about 8 µs. The UWB framing protocol can use at least three channels that are supported with a defined spreading code of pulses within a packet (sequence) of pulses that contributes to a symbol.

The UWB framing protocol can use differential binary phase-shift keying (DBPSK) with coherent receivers. DBPSK is based on the change of polarity between two consecutive pulses. For the UWB infrastructure, this requires for a UWB transmitter to be able to program the polarity of the pulses that are sent, and for the UWB receiver to be able to read the polarity of a received pulse.

An exemplary UWB location system with a UWB infrastructure and a UWB frame format are disclosed, for example, in international patent application PCT/IB2019/000745 entitled "ULTRA-WIDEBAND LOCATION SYSTEMS AND METHODS" filed on Apr. 19, 2019 by BeSpoon SAS, the whole contents of which is incorporated herein in its entirety. Moreover, international patent application PCT/M2019/000745 discloses a server/system-based localization as well as a mobile device-based self-localization. Further details of the mobile device-based self-localization is disclosed, for example, in international patent application PCT/FR2019/052514 entitled "ULTRA-WIDEBAND INDOOR LOCATION SYSTEMS AND METHODS" filed on Oct. 22, 2019 by BeSpoon SAS, the whole contents of which is incorporated herein in its entirety.

Referring again to FIG. 2, the discovery infrastructure 105 is part of the location system 101. The discovery infrastructure 105 opens the location system 101 to any localizing sensor that is technically capable to follow the UWB framing protocol without the need to preinstall a configuration in line with the UWB framing protocol. It is noted that for a localizing sensor specifically only to be operated within a single localizing zone, this information can be preinstalled in the localizing sensor.

However, giving a localizing sensor access to a UWB location system may require in particular that the localizing sensor is identified, is made aware of the organization of the UWB location system, and is assigned to its a role within the UWB infrastructure. The needed information exchange can be transmitted between the UWB location system and the localizing sensor using a short-range wireless data exchange communication system, referred to herein functionally as the discovery infrastructure 105.

The discovery infrastructure 105 includes a discovery signal transceiver 105A that is configured to wirelessly communicate preferably in the frequency range of 2.4 GHz with a respective counterpart discovery signal transceiver provided at the localizing sensor 109. For example, the discovery infrastructure 105 may use an exchange protocol based on Bluetooth, Bluetooth low energy (BLE), or Zigbee Alliance. The data connection is schematically indicated by arrows 106.

It is noted that, while in FIG. 2 the discovery infrastructure 105 is illustrated specifically for illustration purposes as separate structure (structural) units, the discovery infrastructure 105 can be installed within the components of the UWB location system 101 such as the root device 111A, the stationary receivers 113, and the relay transceivers 111B.

Those components can be set up as, e.g., electronics that can have installed thereon various types of communication technologies.

Figure 3:
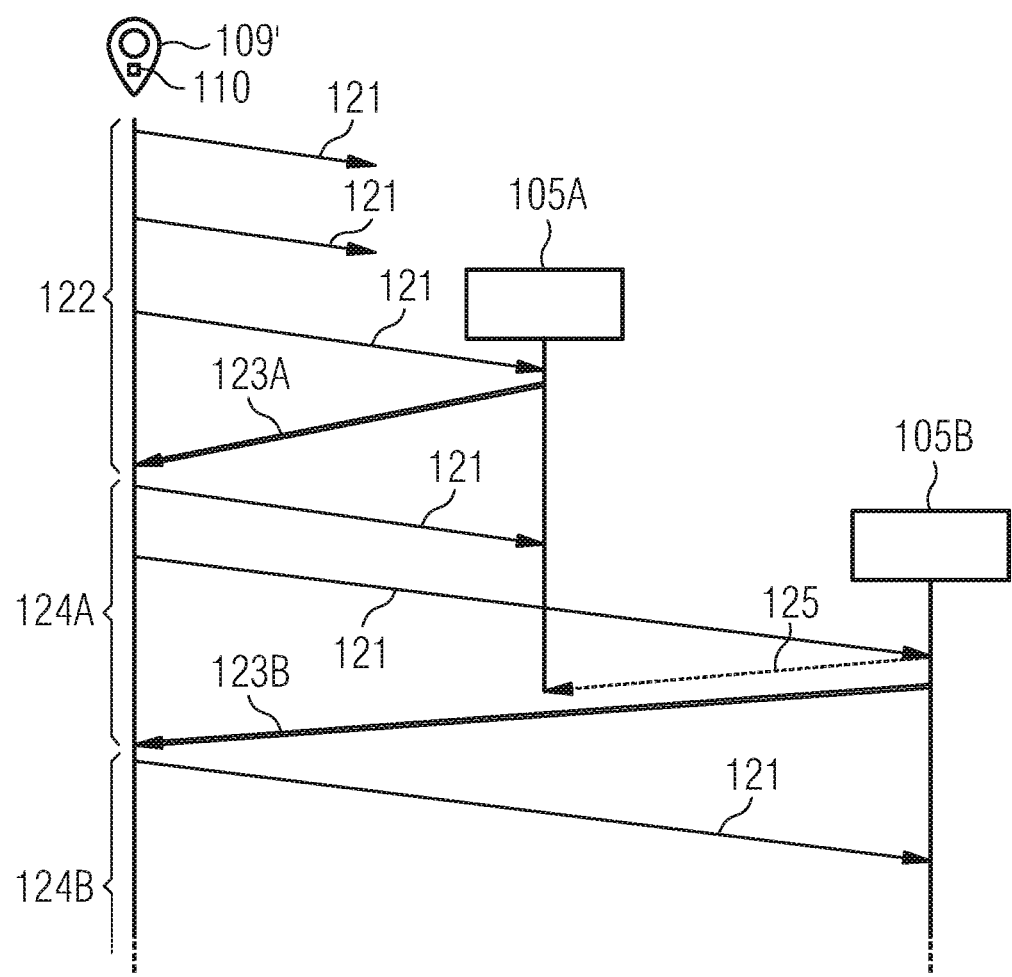
FIG. 3 is a flow chart of an exemplary automated discovery procedure.

In connection with FIG. 3, the discovery is explained exemplarily with respect to BLE. However, the skilled person will appreciate that similar data exchange for a discovery procedure may be performed with other communication systems providing the respective range such as infrared light-based communication.

The initiation of a discovery procedure, here, e.g., a Bluetooth broadcasting, starts when a localizing sensor 109' approaches a core zone (e.g., the localizing zone 115 in FIG. 2), either because it needs to be newly introduced or because it needs to transition from one core zone to another. The localizing sensor 109' uses its discovery signal transceiver 110 to transmit regularly an advertisement signal 121 (advertisement event) to get in touch with the discovery signal transceiver of the respective core zone. During a pure advertisement phase 122 shown in FIG. 3, the localizing sensor 109' is not part of a location system and is not localized.

As an example, the discovery signal transceiver 105A of the respective core zone receives the advertisement signal 121. The discovery signal transceiver 105A may be a separate component or may be combined with any electronic device of the ultra-wideband infrastructure. Preferably the discovery signal transceiver 105A is located close to an entrance area of the core zone, such as a main gate or door of a production site. The discovery signal transceiver 105A is data linked to the controller 107 (see FIG. 2) and confirms with the controller 107 whether the localizing sensor 109' can be included in the system-based localization or that at least performing a self-localizing is allowed.

The controller 107 controls the discovery signal transceiver 105A to transmit a response to the localizing sensor 109' in order to initiate a BLE connection event. In the connection event, a wireless personal area network is set up that is used to send data packets between the discovery signal transceivers. The established Bluetooth dialog includes transmitting a provisioning signal 123A to the localizing sensor 109'. The provisioning signal 123A includes the infrastructure data about the UWB infrastructure of the localizing zone 115.

Generally, the infrastructure data can include at least one of:
  information of the positions of the stationary transmitters within the localizing zone;
  timing information with respect to ultra-wideband beacon signals emitted from the stationary transmitters;
  a slot number associated to a respective one of the localizing sensors for being operated in the first mode of the ultra-wideband localization operation modes;
  a localization rate associated to a respective one of the localizing sensors; or
  the type of ultra-wideband localization operation mode in which a respective one of the localizing sensors can be operated.

With the advertisement signal 121 and/or in response to the provisioning signal 123, the discovery infrastructure can further receive information on the localizing sensors 109' from the localizing sensors 109' or even from the controller 107 if respective information on the localizing sensors 109' is stored (e.g., on the data storage 107B in FIG. 2).

The provisioning enables the integration of the localizing sensor 109' into the UWB localizing and starts a localizing phase 124A. During the localizing phase 124A, the localizing sensor 109' can either establish an UWB exchange, if operated in a system-based operation mode, and/or perform self-localization if operated in a UWB self-localization operation mode.

A localizing sensor may further move on and enter a new core zone, e.g., the sub-zone 103B in FIG. 2. Then, the same advertisement and provisioning process is reproduced to include the localizing sensor 109' in the UWB infrastructure associated with the sub-zone 103B.

For example, once the provisioning is completed for the discovery signal transceiver 105A, the localizing sensor 109' returns to transmitting the advertisement signal 121. As long as the localizing sensor is within the core zone, the discovery signal transceiver 105A is aware of having communicated the required information; no further response is needed/sent.

If, however, as shown in FIG. 3 another discovery signal transceiver 105B receives the advertisement signal 121 due to the localizing sensor 109' approaching a respective core zone, the discovery signal transceiver 105B can initiate another connection event and provide a provisioning signal 123B. The localization can now take place within, e.g., the sub-zone 103B and initiate a new localizing phase 124B. At the same time, the discovery signal transceiver 105B may inform the UWB infrastructure of the former core zone that the UWB localization is now performed in the context of another UWB infrastructure. A closing signal 125 is indicated in FIG. 3 sent from the discovery signal transceiver 105B to the discovery signal transceiver 105A to communicate, e.g., that the localizing sensor 109 acknowledged receipt of the infrastructure data associated with the second zone 103B.

In line with the above, localizing sensors can be preconfigured or activated for UWB localization by a secondary communication system such as the above BLE-based discovery system.

Exemplarily, one may use a BLE profile connection UUID (Universally Unique Identifiers) that is set up specifically for this purpose. An underlying packet structure data structure may comprise various commands to update the topology configuration (information on the spatial distribution of the positions in space) of stationary UWB devices stored in the localizing sensor. For example, one may remove/update one or more stationary devices in the infrastructure definition or change operating parameters. Furthermore, commands may be provided to set the mobile device in server centric mode (system-based localization) or device centric mode (self-localization) by setting a ranging type attribute. Furthermore, commands can fix one axis in the position determination to a constant value.

The underlying packet structure data structure may use the following features of the data format. Entries may relate to the company identification code of the manufacturer of the localizing sensor or the stationary devices, the UWB MAC Address (device dependent), an installed software revision, a hardware identification; battery status information, UWB status information (such as scanning, calibrating, ranging), configuration identification, and coordinates (such as 3D-GPS X coordinate, 3D-GPS Y coordinate, 3D-GPS Z coordinate of the stationary devices). Furthermore, parameters relating to location computation modes, data filtering, and postprocess control may be set.

Based on the discovery procedure, the localizing sensor is enabled and configured to participate in the UWB communication. For example, in response to a received beacon frame, the localizing sensor may send a paring request UWB response and receive then the specific information on how it is integrated into the UWB framing protocol. An exemplary UWB framing protocol is disclosed in the above-mentioned international applications. For example, the provided information relates to a ranging slot at which the localizing sensor is supposed to transmit a ranging frame (UWB response frame) and a repetition rate, more generally the information includes details on a superframe and hyperframe structure. In the following, an exemplary superframe and hyperframe structure is explained in connection with FIG. 4.

In an exemplary UWB framing protocol, the time base for a slot duration may be based on a 32 KHz clock period. The time duration associated to a slot can further relate to 64 periods, e.g., to about 64×1/32768≈64×30.5 μs≈2 ms per slot. The time can be split into a plurality of slots which have different roles in a time-of-flight computation.

Figure 4:
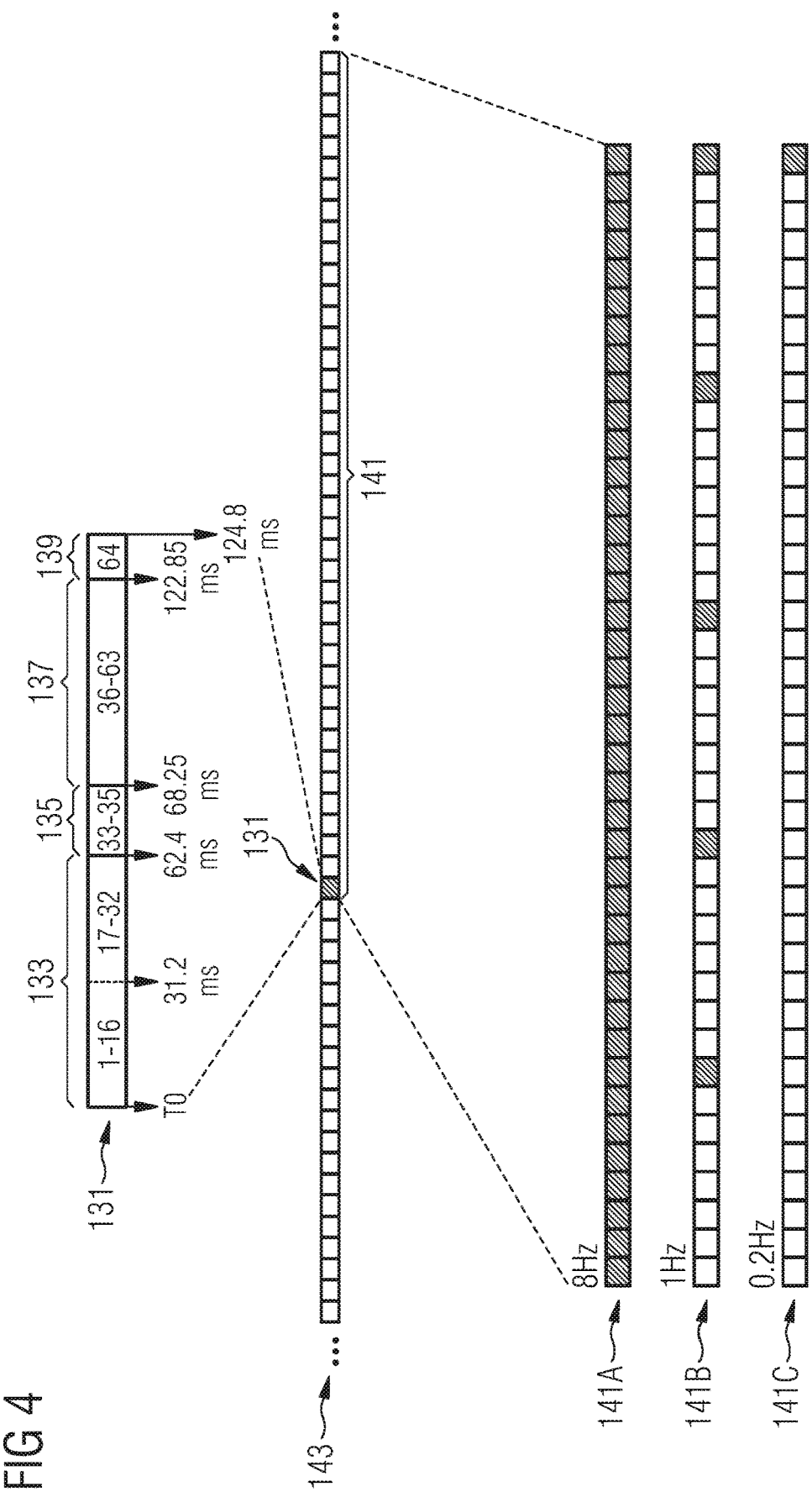
FIG. 4 is an illustration of an exemplary UWB framing concept.

In FIG. 4, a superframe 131 is illustrated that includes a predefined number of slots. For example, a UWB superframe may be built of 64 slots, and thus extend over a time duration of about 125 ms, resulting in a first localization rate of 8 Hz. The superframe 131 defines a first recurrence of the protocol and relates thus to the highest (maximum) localization rate possible to be used in the location system.

The system-based localization mode is based on a two-way ranging approach. Accordingly, the superframe 131 includes beacon slots and ranging slots. For example, the 64 slots may include 32 beacon slots (block 133). The 32 beacon slots can be split in two blocks of 16 beacon slots, respectively associated to pairs of a first beacon frame and a second beacon frame. The first beacon frame and the second beacon frame of each pair can be used for synchronization.

Following the block 133, a block 135 consists of, for example, three intermediate banned slots and separates the beacon slots from the ranging slots.

A block 137 of ranging frames follows the block 35. For example, there may be 28 ranging slots in the block 137.

The superframe 131 may be closed by a closing block 139 of one or more rendez vous slots. A rendez vous slot can be used to exchange information between the stationary devices and localizing sensors, e.g., from a localizing sensor to a root device (that hands then the information further to the controller), and vice versa from the controller via the root device to the localizing sensors.

Referring to a chain 143 of superframes 131 shown in FIG. 4, the UWB framing protocol is based on a continuous repetition of the superframe 131. A plurality of superframes 131 are grouped to form a hyperframe 141. The hyperframe 141 may include, for example, 40 superframes. In that case, the hyperframe 141 extends over a time period of about 5 s. The hyperframe 141 allows handling more localizing sensors as there are ranging slots. Specifically, the ranging can be performed only at specific superframes 131 for one localizing sensor, thereby resulting in different location rates.

For example, the 28 ranging slots can be split into several categories with different location rates. For example, three categories are explained below that enable three different location rates:

a) For example, a ranging slot (e.g., 4 ranging slots) can be used for ranging devices tracked with a localization rate of 8 Hz/period of 125 ms; in that case, the respective ranging slot in every superframe is used for localization of the associated localizing sensor. In FIG. 4, this is indicated in an exemplary hyperframe illustration 141A. Each of the superframes is shaded as it is used by a sensor device for transmitting a UWB response signal. It is noted that although always the complete boxes indicating the superframes are shaded, only a few of the ranging frames are used.

b) For example, a ranging slot (e.g., 16 ranging slots) can be used for ranging devices with a localization rate of 1 Hz/period of 1 s; in this case, the respective ranging slot in every eighth superframe is used for localization of the associated localizing sensor. In FIG. 4, this is indicated in an exemplary hyperframe illustration 141B. Each eighth superframe is shaded as it is used by a sensor device for transmitting a UWB response signal.

c) For example, a ranging slot (e.g., 8 ranging slots) can be used for ranging devices with a localization rate of 0.2 Hz/period of 5 s; in this case, the respective ranging slot in one respective superframe per hyperframe 141 is used for localization of the associated localizing sensor. In FIG. 4, this is indicated in an exemplary hyperframe illustration 141C. Exemplarily, only the last superframe of the hyperframe illustration 141C is shaded as it is used by a sensor device for transmitting a UWB response signal.

Generally, the respective ranging slots may be ordered, e.g., in the example in line with a), b), and c), or may be arbitrarily associated to the various location rates.

Referring to the flowchart shown in FIG. 5A, a method for generating position information for both of the above discussed localization modes includes a step 151 that relates to a discovery procedure as described in connection with FIG. 3. Specifically, step 151 includes an advertisement step 151A for initiating contact between a localizing sensor and a respective discovery infrastructure of a location system. Following the advertisement step 151, a data exchange step 151B (connection event) is used to download respective infrastructure data about the location system, specifically its UWB infrastructure, onto the localizing sensor.

The data exchange step 151B may vary depending on the localization mode to be run on the localizing sensor. For example, information on ranging slots is not needed for self-localization.

Figure 5A:
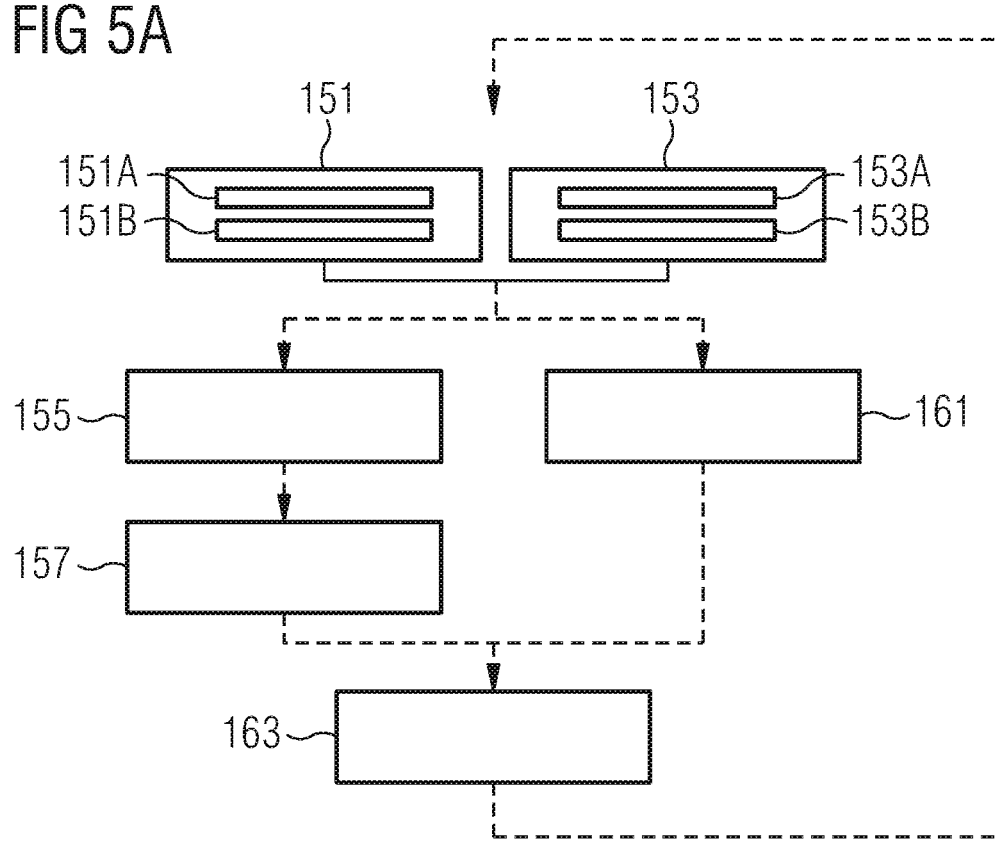
FIG. 5A is a flowchart illustrating a method for localizing using two operation modes.

As illustrated in FIG. 5A, equally relevant for both of the localization modes is a step 153 that relates to a synchronization between stationary devices of the location system. Specifically, while a synchronization 153A of stationary transmitters is needed for the self-localization mode, a synchronization 153B of stationary receivers is needed for the system-based localization mode. In both cases, the synchronization is performed in relation to a root device. An example of a synchronization procedure is described in the above-mentioned international patent applications by BeSpoon SAS based on two beacon frames emitted at a predefined temporal separation.

In FIG. 5A, the flowchart then separates into two branches relating to the two localization modes, respectively.

For the system-based localization, a pairing step 155 using at least one specific UWB frame is performed to specifically provide information on the UWB framing protocol (the information is, e.g., exchanged during a rendez vous slot). Specifically, the UWB infrastructure (usually the root device) provides information on the ranging slot associated to the localizing sensor. Moreover, information on the localization rate associated to the localizing sensor can be exchanged, for example.

The system-based localization is performed during step 157 as illustrated in connection with FIG. 5B. Specifically, the localizing sensor listens to UWB beacon signals BF1, BF2 (also referred to as beacon frames) transmitted during the respective beacon slots and transmits UWB response signals RF (also referred to as response frames) during the ranging slot associated to i the localizing sensor t.

The UWB response signal RF can include information on the UWB transmitter based on which the timing was determined for the transmission of the UWB response signal. Due to the highly accurate synchronization, the localizing sensor sends very accurately his UWB response signal according to a predefined timing formula. It is noted that the UWB beacon signal and the UWB response signal do not include any exchange of timestamp information between the beacon transmitter and the localizing sensor.

Figure 5B:
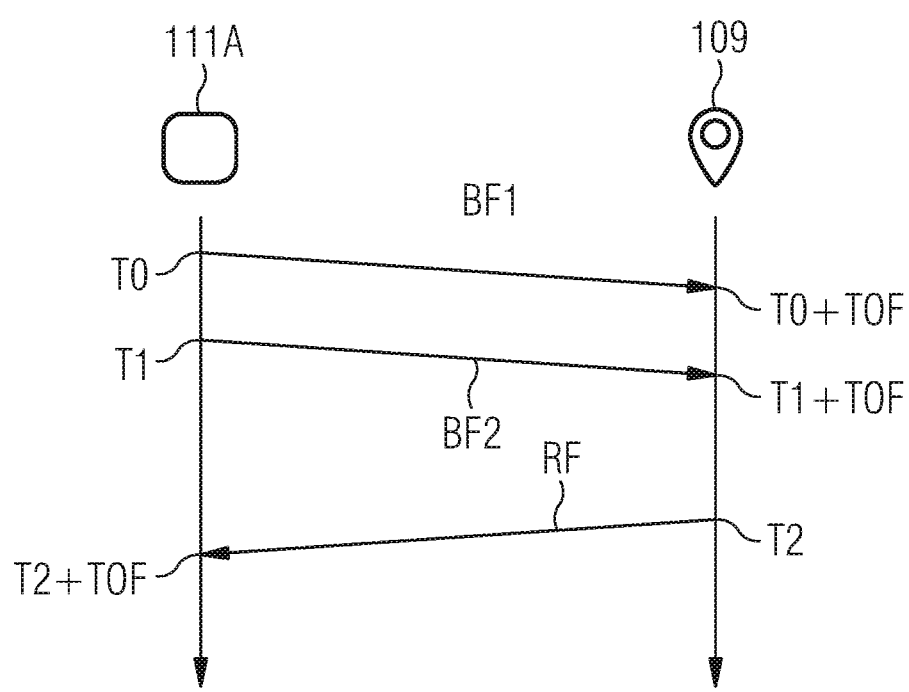
FIG. 5B is an illustration of an exemplary UWB signal exchange.

FIG. 5B illustrates an exemplary UWB signal exchange (between the root device 111A and the localizing sensor 109) that is used for synchronization and ToF analysis.

The UWB beacon signals BF1, BF2 are transmitted at every superframe (e.g., at the rate of 125 ms). For example, the root device UWB transmits beacon signals BF1, BF2, which can be listened to by the localizing sensors and other stationary devices to synchronize themselves.

The timing considerations for the ToF analysis depends on the selection of UWB beacon signal BF1, BF2 that is used:

T2−(T0+ToF)=N×Time duration of a single slot (N=20 to 57 in the above example); or T2−(T1+ToF)=M×Time duration of a single slot (M=4 to 31 in the above example), with T0, T1: emission time points of UWB beacon signals BF1, BF2 (by the root device 111A), respectively, ToF: the time of flight of the UWB beacon signals BF1, BF2 to the UWB receiver or the localizing sensor, T2: the emission time point of the UWB response signal RF (in FIG. 5B reception by the root device 111A will accordingly take place at reception time point T2+TOF, respective reception time points are given for the stationary receivers 113, depending on their position with respect to the localizing sensor 109), N, M: numbers of slots from the (respective) beacon slot (associated to the root device) to the ranging slot (associated to the localizing sensor).

For calculating the position, the UWB receivers and the root device can communicate, for example, the time points of reception of the UWB response signal RF (including, for example, the above reception time point T2+TOF) as well as the emission time points T0, T1 to the controller. The controller can compute the position data according to the centralized database of positions of the stationary devices (transmitters and receivers) and the time slot allocated to the localizing sensor.

Referring to step 163, the participation of the localizing sensor at the localizing procedure can be terminated. A rendezvous slot of the superframe can be used to communicate respective termination information (a respective disassociation signal/frame) to the associated localizing sensor.

For the self-localization of step 161, the flowchart proceeds from step 151/step 153 to step 161. Specifically, during step 151B, the localizing sensor received configuration data that informs on the correct UWB beacon signals to listen to as well as provided the respective "topology" information (position data) of the respective UWB signal transmitters.

During step 161, the localizing sensor listens to all the UWB signal transmitters and can derive based on the time of arrival of the beacon frames its own position under consideration of the positions of the UWB signal transmitters, the known time-of-flight between UWB signal transmitters, the references in the beacon signals to the respective UWB signal transmitters, and the exact transmission timings known for the respective UWB signal transmitters.

It is noted that there is no pairing requirement of the localizing sensor operated in the self-localization mode because only UWB signals are received (and none are transmitted). Accordingly, there is no need also for a disassociation.

Finally, if a location zone is left and one is newly entered (step 163 in FIG. 5A), the above steps can be performed again—starting at the provisioning of the infrastructure data (step 151A).

Figure 6:
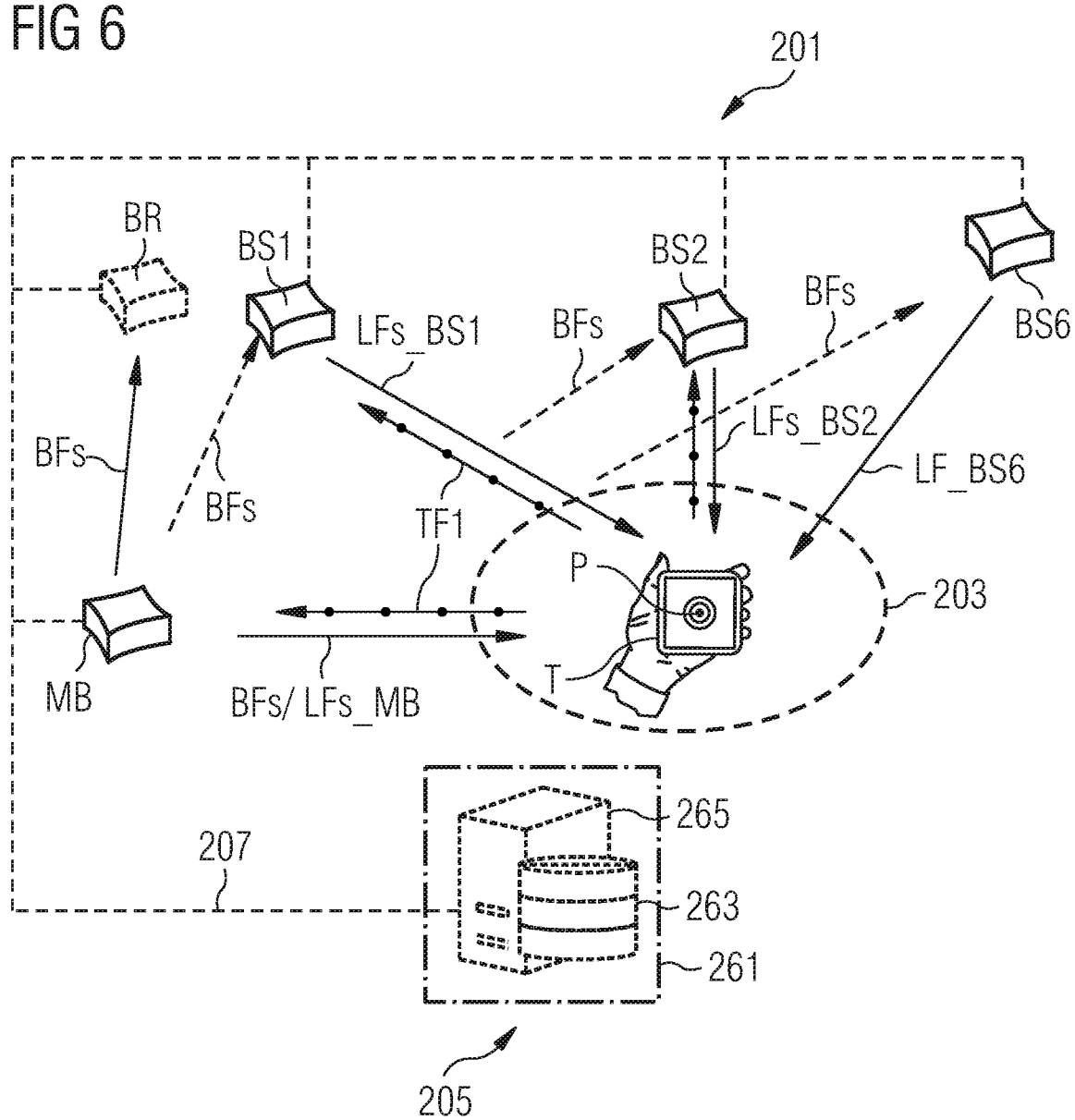
FIG. 6 is a schematic illustration of an exemplary UWB location system.

Referring to FIG. 6, various components of an (ultra-wideband indoor real-time) location system 201 are shown schematically such as a master beacon device MB (corresponding to master transceiver 11A in FIG. 1), an (exemplary hand held) mobile tag device T (corresponding to localizing sensor 9 in FIG. 1), several beacon satellite devices BS1, BS2, BS6 (corresponding to receivers 13 in FIG. 1), and exemplarily a beacon repeater device BR (corresponding to relay transceiver 11B).

With respect to an exemplary embodiment of UWB signal transmitters, it is referred to the sections "Master beacon device" of the above-mentioned international patent applications, which are specifically incorporated by reference herein. With respect to an exemplary embodiment of the mobile tag device/localizing sensor, it is referred to the sections "(Mobile) tag devices" of the above-mentioned international patent applications, which are specifically incorporated by reference herein (see, e.g., sections "Reception units" and "Calibration and calculation units").

Specifically, a tag device/localizing sensor is a unit that is to be located within a location area (corresponding to the localizing zone 115 in FIG. 1) of the location system. Preferably the tag device/localizing sensor is a mobile unit, which means that it is not permanently at the same place, which makes it interesting to localize. It may be moved by being attached to or being part of a moving object. The mobile tag device/localizing sensor receives UWB signals from a plurality of UWB signal transmitters. The tag device may include a (beacon/signal) reception unit, a two-clock electronic device including a slave clock and master clock as a tag clock, and a (optionally calibration and) calculation unit including a time detection unit, an identification unit, and a control unit. The tag clock may be realized as a clock-pulse-generator or a clock-wave-generator. The tag clock defines a tag time for each tag/localizing sensor. As for the master beacon device, some or all of these elements, in particular the two-clock electronic device may be part of a UWB chip. The tag device/localizing sensor can receive UWB signals, specifically the master (or repeater) beacon frames, with the signal reception unit. The signal reception unit may comprise a reception (Rx) antenna. The tag device may further send UWB signals to be received from other components of the UWB location system. A tag/localizing sensor may be placed in a housing, which may also encompass other functionalities such as a smartphone, a computer, a control system of an automated guided vehicle etc., for example.

For the TDoA analysis, the location system has information on the positions of the stationary devices of the UWB infrastructure (e.g., master beacon device, and the beacon satellite device(s)).

In an exemplary embodiment, the beacon satellite devices BS1, BS2, BS6 and the beacon repeater device BR may each include a receptor unit, thereby having also the functionality of being synchronizable with the master beacon device MB. It is noted that usually a master beacon device MB or a beacon repeater device BR can be installed within a room or hall, generally a localizing sub-zone covered by the location system 201, to ensure temporal synchronization of the transmitted UWB signals.

The tag device T/localizing sensor may be configured to determine its position within space, specifically within a location area 203/localizing zone from the received UWB signals. In the present field of localizing, real time means that position information is available fast enough compared to the speed of movement of a tag device/localizing sensor such that the movement can temporally be resolved to a sufficient degree. The location area 203/localizing zone is defined by the coverage of the UWB signal exchange between the various components.

In the exemplary embodiment of FIG. 6, the location system 201 further includes a (system) control unit 205 (corresponding to controller 7 in FIG. 1) that is connected for data exchange with the master beacon device MB and beacon satellite devices BS1, BS2, BS6, and the beacon repeater device BR. The data connections may be based on cables 207 or may be wireless. Thus, the components may be part of a LAN and/or WLAN network or other communication network(s). The control unit 205 may include a centralized computer system 261 or a decentralized computer system with a data storage unit 263 and a calculation unit 265. The data storage unit 263 may store, e.g., a master time delay data between the UWB beacon signals and the slot information of the satellite devices, e.g. for clock synchronization.

In addition, the UWB signal transmission is schematically illustrated in FIG. 6. The master beacon device MB and the beacon satellite devices BS1, BS2, BS6 transmit beacon frames BFs/LFs_MB, LFs_LBS1, LFs_LBS2, . . . LF_BS6 that can be received by the tag device T/localizing sensor within the location area 203. The tag device T/localizing sensor processes the UWB signals for localization. In addition, beacon satellite devices BS1, BS2, BS6 may also receive and process the UWB signals of the master beacon device MB (indicated as beacon frames BFs) for clock calibration (see the above-mentioned international patent application PCT/IB2019/000745 for an exemplary calibration approach).

The master beacon device MB and beacon satellite devices BS1, BS2, BS6 may further receive beacon frames/ UWB tag response signals TF1 emitted from the tag for non-tag centric approaches. For example, the tag devices T/localizing sensor may emit tag response frames with a tag specific time delay in line with the location protocol. The master beacon device MB and beacon satellite devices BS1, BS2, BS6 may act as tag response receptors and will receive the tag response frame TF1 and derive a specific time of arrival for the tag device T for the tag response frame TF1. In combination with the emission time of the beacon frames BFs from the master beacon device MB or a beacon repeater device BR, a time difference-of-arrival analysis can be performed by the respective tag response receptor TRR.

Furthermore, FIG. 6 indicates a concept of using the beacon repeater device BR to extend the range of the location system 201 (in particular the synchronization) e.g. over several rooms. For that purpose, the beacon repeater device BR emits repeater beacon frames that cover an associated zone, usually at least one room, in which it may function as a master beacon device, e.g., for calibration.

In the case that a tag device/localizing sensor is configured to have sufficient computing power required for performing analysis and calculation of reception time points of master and repeater frames (and provided that the tag device knows the exact location of each beacon transmitter such as the master beacon and the repeater beacons), the tag device/ localizing sensor—when receiving beacon frames sent at time slots of a predefined beacon section of the location frame format—may determine distance information for the distances between the tag device to the master beacon device and the plurality of beacon satellite devices based on position information of the master beacon device and the plurality of beacon satellite devices. Specifically, based on a plurality of time points of arrival, a time difference-of-arrival analysis can be performed within the mobile tag device. Alternatively, the localizing may be performed by the control unit 205.

An exemplary stationary anchor such as a master beacon device MB or a beacon satellite device BS1, . . . in FIG. 6 may comprises a housing with, e.g., several through holes for fastening screws to attach the anchor stationary to a wall or ceiling at a spatially fixed position in 3D-space. Within the housing, the anchor may include a beacon transmission unit that is configured to perform transmission of localizing beacon frames LFs_MB, LFs_BS1 . . . . and/or a UWB transceiver unit. The anchor may further include a master (satellite) clock defining a master (satellite) time. In the latter case, the anchor may further include a master (satellite) storage unit and optionally a calibration and calculation unit including the herein disclosed two-clock electronic device. Some or all of the above components may be integrated at least partly within a common UWB chip and/or may be mounted to a base plate or substrate.

An exemplary tag device/localizing sensor may comprise a housing with a display and an opening, for example, for attaching to some to be located object. Alternatively, the tag device may be integrated in some device such as a self-moving object. The tag device may include a two-clock electronic device with a master clock as a tag clock defining a tag time that is specific for the respective tag device. The tag device may further include a tag data storage unit.

The tag device/localizing sensor may further include a UWB reception and/or a UWB transceiver unit and an (optionally calibration and) calculation unit. The reception unit is configured as a UWB frame receiver to receive the beacon frames sent from the master beacon device or a beacon satellite device, thereby measuring respective time points of arrival. The calculation unit may include a time detection unit configured to derive respective arrival time points for the received UWB signals, an identification unit configured to derive the unique information content from the received UWB signals, and optionally a control unit configured to process the unique information content and the arrival time points for at least a subset of UWB signal transmitters in a localizing algorithm to derive the position of the mobile tag device with respect to the subset of the UWB signal transmitters. The above components of a tag device may be integrated at least partly within a common UWB chip and/or may be mounted to a base plate or substrate.

For the discovery procedure, the tag device/localizing sensor and at least one stationary anchor may include respective components required for the second data communication system. For example, BLE electronic elements such as an antenna, a BLE chip for controlling the reception and transmission of BLE communication signals, as well as electronic circuits for analyzing and defining the BLE communication signals. The (BLE) components may be integrated at least partly within a common BLE chip and/or may be mounted to a base plate or substrate.

While in some embodiments one of the plurality of stationary transmitters and one of the plurality of stationary receivers can be configured as a transceiver, which is stationary installed in the localizing zone at a fix position, in some embodiments, one of the plurality of stationary transmitters and one of the plurality of stationary receivers can be configured as a mobile transceiver forming a localizing sensor operated in the first mode, wherein the mobile transceiver is positioned in the localizing zone and does not move during an execution of an ultra-wideband localization operation. Respective information can be communicated via the rendez vouz frame.

It is noted that the discovery procedure can also be used to transfer the infrastructure data to devices that can use the infrastructure data differently for localization: specifically, the position of the anchors can be used for orientation independently from the UWB infrastructure. For example, the infrastructure data can be used by such a non-UWB-localizing sensor, e.g., virtual reality or augmented reality glasses that can use the coordinates of the anchors received via, e.g., BLE communication, to determine their position in the UWB coordinate system.

For example, referring to FIG. 2, optionally at least one further mobile device 401 (e.g., an AGV) can be configured to wirelessly communicate with the discovery infrastructure 105 to receive the infrastructure data (arrow 106'). The mobile device 401 compares the infrastructure data with environment data that the mobile device 401 derives from imaging an environment of the mobile device with an image acquisition system 401A, and/or a LIDAR system.

Figure 7:
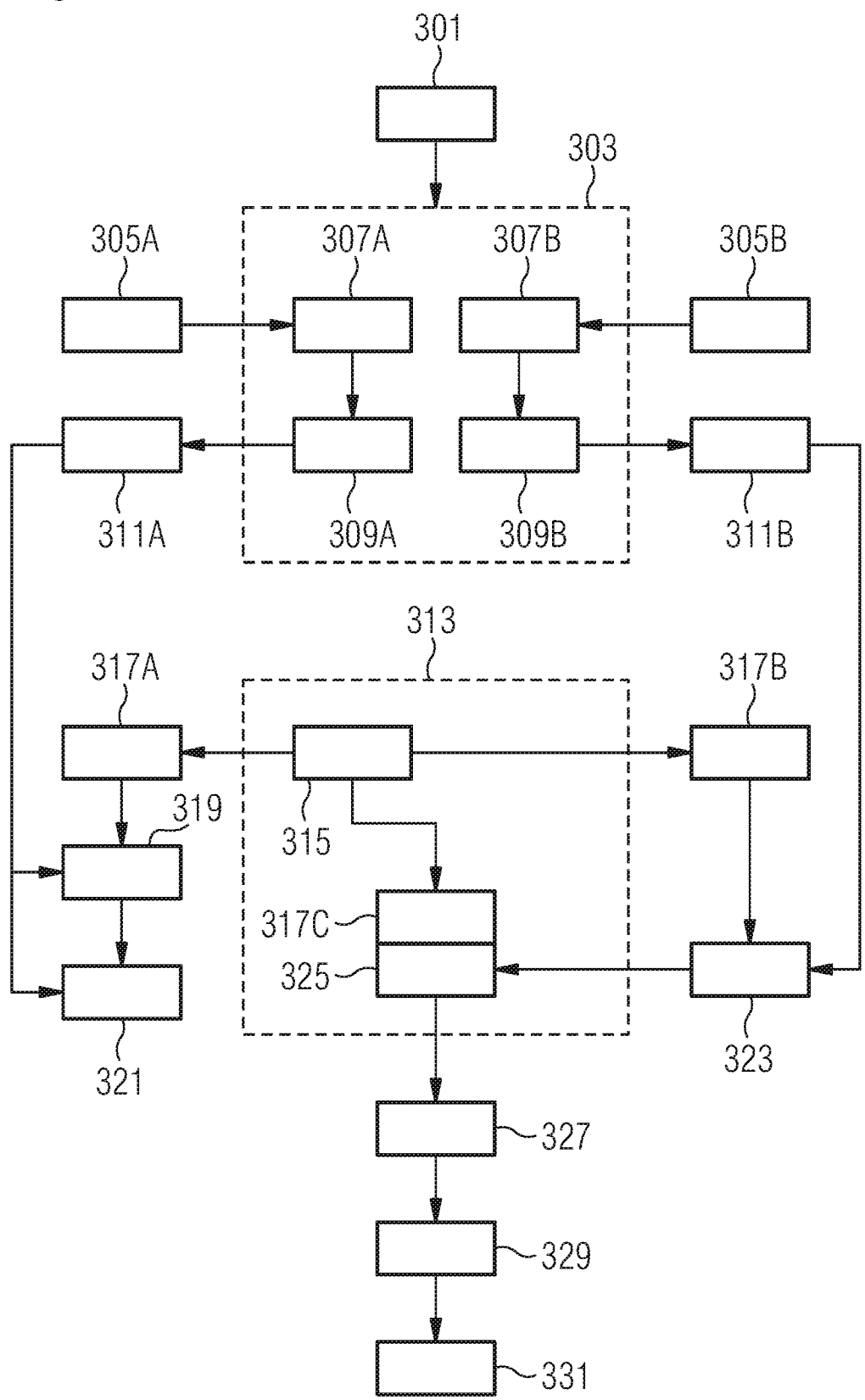
FIG. 7 is a schematic flowchart of the discovery and UWB localization

Referring to FIG. 7, the interleaved activities of a location system and two localizing sensors operated in two different ultra-wideband localization operation modes, e.g., a first mode requiring the emission of ultra-wideband response signals from the localizing sensor, and a second mode requiring computation of position information based on ultra-wideband beacon signals received by the localizing sensor, respectively, are described. It is noted that the location system may only be used in one of the ultra-wideband localization operation modes.

Within the location system (e.g. at a data storage), infrastructure data about the ultra-wideband infrastructure is stored (step 301) that is required to operate each of the two localizing sensors in its ultra-wideband localization operation mode. Then, the discovery infrastructure of the location system performs a wireless communication of the infrastructure data to the localizing sensors (step 303). As a result of the wireless communication, the localizing sensors receive infrastructure data about the ultra-wideband infrastructure of the location system.

The wireless communication for the discovery (i.e., the recognition procedure that a new localizing sensor would like to be included within the operation of the location system) includes the following steps:
- sending (step 305A, step 305B) with each of the localizing sensors a respective discovery advertisement signal;
- receiving (step 307A, 307B) with the discovery infrastructure the discovery advertisement signals emitted from the localizing sensor;
- sending with the discovery infrastructure (in response to each of the discovery advertisement signals) a provisioning signal (step 309A, 309B) including the infrastructure data configured in each case for operation of the respective localizing sensor within the respective ultra-wideband infrastructure in the respective ultra-wideband localization operation mode; and
- receiving (step 311A, 311B) with the localizing sensors respective provisioning signals including the respective infrastructure data.

Already during the discovery or after completion of the discovery of a new localizing sensor, the ultra-wideband infrastructure is operated (step 313) to enable the localizing.

This includes for the first mode, emitting ultra-wideband beacon signals into the localizing zone with a plurality of stationary transmitters (step 315). The localizing sensor operated in the first mode receives the ultra-wideband beacon signals emitted from the plurality of stationary transmitters of the ultra-wideband infrastructure (step 317). Then, the localizing sensor uses the infrastructure data to derive timing information from the ultra-wideband beacon signals (step 319) and calculate from the timing information position data of the localizing sensor (step 321).

The localizing includes for the second mode also the emission of ultra-wideband beacon signals into the localizing zone with the plurality of stationary transmitters (step 315). The localizing sensor operated in the second mode receives the ultra-wideband beacon signals emitted from one of the stationary transmitters of the ultra-wideband infrastructure (step 317B). Also a plurality of stationary receivers receives the ultra-wideband beacon signals from one of the stationary transmitters (step 317C). The localizing sensor and the stationary receivers can, e.g., perform a time synchronization based on the ultra-wideband beacon signals.

The localizing sensor emits (step 323) ultra-wideband response signals in response to the ultra-wideband beacon signals at response time points that is set with respect to reception time points of the ultra-wideband beacon signals using the infrastructure data. The plurality of stationary receivers receives (step 325) the ultra-wideband response signals emitted from the localizing sensor operated in the first mode. The location system, e.g., a processor receives (step 327) timing information for the ultra-wideband beacon signals and the ultra-wideband response signals from the plurality of stationary receivers and calculates (step 329) from the timing information position data of the localizing sensor (operated in the first mode) within the localizing zone. The position data is then output (step 331) for use in at least one industrial application.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Although the preferred embodiments of this invention have been described herein, improvements and modifications may be incorporated without departing from the scope of the following claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A location system for interacting with a localizing sensor operatable in an ultra-wideband localization operation mode requiring computation of position information based on received ultra-wideband beacon signals received by the localizing sensor, the location system comprising:
    an ultra-wideband infrastructure configured to enable localization for the ultra-wideband localization operation mode, the ultra-wideband infrastructure comprising: a plurality of stationary transmitters configured to emit the ultra-wideband beacon signals into a localizing zone;
    a discovery infrastructure configured to perform a wireless communication of infrastructure data to the localizing sensor, the discovery infrastructure comprising at least one discovery signal transceiver configured to:
        receive a discovery advertisement signal emitted from the localizing sensor; and
        in response to receiving the discovery advertisement signal, send a provisioning signal comprising the infrastructure data to the localizing sensor, wherein the infrastructure data comprises information on the plurality of stationary transmitters of the ultra-wideband infrastructure; and
    a controller configured to control operation of the ultra-wideband infrastructure and the discovery infrastructure, wherein the controller comprises a processor, and a data storage, wherein:
        the data storage is configured to store the infrastructure data that is required to operate the localizing sensor in the ultra-wideband localization operation mode in accordance with an ultra-wideband framing protocol, and
        the processor is configured to control the at least one discovery signal transceiver to send the provisioning signal to the localizing sensor in response to the receiving the discovery advertisement signal.

2. The location system of claim 1, wherein the infrastructure data comprises at least one of:
    information of positions of the stationary transmitters within the localizing zone; or
    timing information with respect to the ultra-wideband beacon signals emitted from the stationary transmitters, or
    wherein the discovery infrastructure is further configured to receive information on the localizing sensor from the controller.

3. The location system of claim 1, wherein the at least one discovery signal transceiver is configured to wirelessly receive or transmit at least one of:
    an advertisement signal configured to initiate a first wireless communication with a specific one of a plurality of localizing sensors entering the localizing zone;
    a first provisioning signal configured to provide the infrastructure data to the specific one of the plurality of localizing sensors; or
    a closing signal configured to close an ultra-wideband communication when the specific one of the plurality of localizing sensors leaves the localizing zone.

4. The location system of claim 1, wherein the at least one discovery signal transceiver is configured to wirelessly communicate in a frequency range around 2.4 GHz and is configured to use an exchange protocol based on Bluetooth, Bluetooth low energy, or Zigbee.

5. The location system of claim 1, wherein an area associated with the controller is divided into a plurality of zones,
    wherein a first zone of the plurality of zones is associated with:
        a first subgroup of the plurality of stationary transmitters; and
        a first discovery signal transceiver for communicating first infrastructure data associated with the first zone, and
    wherein a second zone of the plurality of zones is associated with:
        a second subgroup of the plurality of stationary transmitters; and
        a second discovery signal transceiver for communicating second infrastructure data associated with the second zone.

6. The location system of claim 5, wherein the second discovery signal transceiver is configured to communicate to the first discovery signal transceiver that a localizing sensor acknowledged receipt of the infrastructure data associated with the second zone.

7. The location system of claim 1, wherein the localizing sensor is one of a plurality of localizing sensors, the plurality of localizing sensors being operatable in at least one of a first mode requiring emission of ultra-wideband response signals from a respective localizing sensor, or a second mode requiring the computation of the position information based on the received ultra-wideband beacon signals received by a respective localizing sensor, wherein:
    the ultra-wideband infrastructure further comprises:
        a plurality of stationary receivers configured to receive the ultra-wideband beacon signals and the ultra-wideband response signals emitted from a first group of the plurality of localizing sensors operated in the first mode; and
    the controller further comprises a data output, wherein:
        the infrastructure data stored in the data storage is required to operate the plurality of localizing sensors in the first mode and the second mode, and
        the processor is further configured to:
            receive timing information for the ultra-wideband beacon signals and the ultra-wideband response signals, and calculate from the timing information position data of the first group of localizing sensors within the localizing zone; and
            output the position data at the data output for use in at least one industrial application.

8. The location system of claim 7, wherein the infrastructure data further comprises at least one of:
    information of positions of the stationary receivers within the localizing zone;

a slot number associated with a respective one of the plurality of localizing sensors for being operated in the first mode;

a localization rate associated te a the respective one of the plurality of localizing sensors; or the first mode or the second mode in which the respective one of the plurality of localizing sensors is to be operated.

9. The location system of claim 7, wherein one of the plurality of stationary transmitters and one of the plurality of stationary receivers are configured as:

a transceiver stationary installed in the localizing zone at a fix position, or a mobile transceiver forming a respective localizing sensor operated in the first mode, wherein the mobile transceiver is positioned in the localizing zone and does not move during an execution of an ultra-wideband localization operation.

10. The location system of claim 7, wherein the plurality of stationary transmitters is configured to emit the ultra-wideband beacon signals in accordance with an ultra-wideband framing protocol that defines a superframe to include:

a predefined number of beacon slots, a pre-predefined number of ranging slots separated from the beacon slots by a predefined number of banned slots, and at least one rendezvous slot.

11. The location system of claim 7, wherein the plurality of stationary transmitters is configured to emit the ultra-wideband beacon signals in accordance with an ultra-wideband framing protocol that includes up to several hundred time slots in a hyperframe structure, and wherein, based on the hyperframe structure, the first group of localizing sensors operated in the first mode is configured to emit the ultra-wideband response signals at a plurality of localization rates comprising rates at 8 Hz, 1 Hz, and 0.2 Hz.

12. The location system of claim 7, wherein the second mode is set to perform a self-localization at a localization rate given by a time duration of the-a superframe or smaller.

13. The location system of claim 7, wherein one of the plurality of stationary transmitters and one of the plurality of stationary receivers are implemented as a transceiver configured to receive the ultra-wideband beacon signals and the ultra-wideband response signals, and to transmit ultra-wideband repeater beacon signals.

14. The location system of claim 7, wherein the ultra-wideband framing protocol defines a hyperframe comprising a predefined number of superframes, and different localization rates are implemented by using selected ones of the superframes in the hyperframe.

15. The location system of claim 14, wherein for a highest localization rate, each superframe is used, and subgroups of equally spaced superframes are used for other localization rates.

16. The location system of claim 1, wherein the location system further comprises at least one of:

a plurality of localizing sensors, each localizing sensor configured to wirelessly communicate with the discovery infrastructure to receive the infrastructure data, and operate in at least one of two ultra-wideband localization operation modes, or at least one further mobile device that is configured to wirelessly communicate with the discovery infrastructure to receive the infrastructure data,; and compare the infrastructure data with environment data that the mobile device derives from imaging an environment of the mobile device with an image acquisition system.

17. A method for operating a localizing sensor in an ultra-wideband localization operation mode for computation of position information by the localizing sensor, the method comprising:

sending with the localizing sensor a discovery advertisement signal;

in response to the discovery advertisement signal, receiving, with the localizing sensor, a provisioning signal including infrastructure data by wireless communication from a discovery infrastructure, wherein the infrastructure data is configured for operation of the localizing sensor within an ultra-wideband infrastructure in the ultra-wideband localization operation mode and comprises information on a plurality of stationary transmitters of the ultra-wideband infrastructure;

receiving with the localizing sensor ultra-wideband beacon signals emitted from the plurality of stationary transmitters of the ultra-wideband infrastructure;

deriving with the localizing sensor timing information from the ultra-wideband beacon signals; and calculating with the localizing sensor, from the timing information, position data of the localizing sensor using the infrastructure data.

18. A method for interacting with a localizing sensor being operatable within an ultra-wideband infrastructure in at least one of two ultra-wideband localization operation modes, the two ultra-wideband localization operation modes comprising a first mode requiring emission of ultra-wideband response signals from the localizing sensor, and a second mode requiring computation of position information based on ultra-wideband beacon signals received by the localizing sensor, the method comprising:

storing infrastructure data on the ultra-wideband infrastructure that is required to operate the localizing sensor in the two ultra-wideband localization operation modes, wherein the infrastructure data comprises information on a plurality of stationary transmitters of the ultra-wideband infrastructure; and operating a discovery infrastructure to perform a wireless communication of the infrastructure data to the localizing sensor, the wireless communication comprising:

receiving a discovery advertisement signal emitted from the localizing sensor, and sending in response a provisioning signal including the infrastructure data; and operating the ultra-wideband infrastructure to enable the-localizing:

with the first mode by, with the plurality of stationary transmitters, emitting ultra-wideband beacon signals into a localizing zone; and with a plurality of stationary receivers, receiving the ultra-wideband beacon signals and ultra-wideband response signals emitted from the localizing sensor if operated in the first mode;

receiving timing information for the ultra-wideband beacon signals and the ultra-wideband response signals from the plurality of stationary receivers;

calculating from the timing information position data of the localizing sensor within the localizing zone; and outputting the position data for use in at least one industrial application;

or with the second mode by, with a the plurality of stationary transmitters, emitting ultra-wideband beacon signals into the localizing zone.

19. A method for operating a localizing sensor within an ultra-wideband infrastructure, the method comprising:

sending with the localizing sensor a discovery advertisement signal;

in response to the discovery advertisement signal, receiving with the localizing sensor a provisioning signal including infrastructure data on an ultra-wideband infrastructure by wireless communication from a discovery infrastructure, wherein the infrastructure data is configured for operation of the localizing sensor within the ultra-wideband infrastructure and comprises information on a plurality of stationary transmitters of the ultra-wideband infrastructure receiving with the localizing sensor ultra-wideband beacon signals emitted from the plurality of stationary transmitters of the ultra-wideband infrastructure; and emitting with the localizing sensor ultra-wideband response signals in response to the ultra-wideband beacon signals at response time points set with respect to reception time points of the ultra-wideband beacon signals using the infrastructure data.

* * * * *